US006836862B1

(12) United States Patent
Erekson et al.

(10) Patent No.: US 6,836,862 B1
(45) Date of Patent: Dec. 28, 2004

(54) METHOD OF INDICATING WIRELESS CONNECTION INTEGRITY

(75) Inventors: Rich Erekson, Ogden, UT (US); Darrell Goff, Layton, UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/557,944

(22) Filed: Apr. 24, 2000

(51) Int. Cl.[7] .............................................. G06F 11/00
(52) U.S. Cl. ..................................... 714/704; 714/758
(58) Field of Search ................................ 714/704, 758

(56) References Cited

U.S. PATENT DOCUMENTS

| | | | | | |
|---|---|---|---|---|---|
| 5,513,185 | A | * | 4/1996 | Schmidt ..................... | 714/708 |
| 5,956,330 | A | * | 9/1999 | Kerns ......................... | 370/336 |
| 6,088,337 | A | * | 7/2000 | Eastmond et al. .......... | 370/280 |
| 6,222,819 | B1 | * | 4/2001 | Lysejko et al. ............. | 370/209 |
| 6,243,568 | B1 | * | 6/2001 | Detlef et al. ............. | 455/226.4 |
| 6,449,255 | B1 | * | 9/2002 | Waclawsky ................. | 370/236 |
| 6,587,985 | B1 | * | 7/2003 | Fukushima et al. ......... | 714/748 |

OTHER PUBLICATIONS

Exerpts from "Specification of the Bluetooth System", Compiled by Dan Sonnerstam, Pyramid Communications AB, V 1.0 B, Dec. 1, 1999, ref:http://www.bluetooth.com. Pages included: 1–13, 70, 71, 527, 686,691, 693.*

* cited by examiner

Primary Examiner—Guy J. Lamarre
Assistant Examiner—John Trimmings

(57) ABSTRACT

A method and system thereof for monitoring the data transfer integrity of a wireless connection between two devices, in particular two Bluetooth-enabled transceivers. A number of data packets are transmitted from one of the two devices to the other in a first-occurring transmission. The receiving device indicates to the transmitting device whether any of the data packets were not successfully received. Any data packets that were not successfully received are retransmitted. The integrity of the wireless connection is measured, for example, by determining the number of data packets successfully transmitted in the first-occurring transmission relative to the total number of data packets transmitted and retransmitted. The measure of wireless connection integrity can be provided to a user via either a visual or audio indication, or it can be provided to another device such as a computer system, so that corrective actions can be taken if needed in order to improve the data transfer integrity of the wireless connection.

27 Claims, 8 Drawing Sheets

METHOD OF INDICATING WIRELESS CONNECTION INTEGRITY

TECHNICAL FIELD

The present invention relates to systems and devices connected using wireless links, specifically systems and devices that use the Bluetooth technology. In particular, the present invention pertains to measurement of the data transfer integrity (e.g., the bit error rate) of a wireless connection.

BACKGROUND ART

Computer systems and other types of consumer electronic devices are commonly linked to each other and to peripheral devices using a myriad of different types of cables and connectors. As these devices grow in number and variety, their cables and connectors can often become quite cumbersome to work with. Accordingly, efforts are underway to develop technologies allowing hardware connections to be replaced with wireless ones.

One such technology is the Bluetooth technology. Bluetooth is the code name for a technology specification for small form factor, low-cost, short-range radio links between personal computers (PCs), mobile phones and other devices. Bluetooth is targeted at mobile and business users who need to establish a link, or small network, between their computer, cellular phone and other peripherals. The required and nominal range of Bluetooth is thus set to approximately ten (10) meters. To support other uses, for example the home environment, Bluetooth can be augmented to extend the range to up to 100 meters.

The Bluetooth technology will allow the many proprietary cables that connect one device to another to be replaced with short-range radio links. The Bluetooth technology is based on a high-performance, yet low-cost, integrated radio transceiver. For instance, Bluetooth transceivers built into both a cellular telephone and a laptop computer system would replace the cables used today to connect a laptop to a cellular telephone. Printers, personal digital assistants (PDAs), desktops, fax machines, keyboards, joysticks and virtually any other digital device can be part of a Bluetooth system. Bluetooth radio technology can also provide: a universal bridge to existing data networks, a peripheral interface, and a mechanism to form small private ad hoc groupings ("scatternets" or "piconets") of connected devices away from fixed network infrastructures.

Bluetooth is being designed to operate in a noisy radio frequency environment. A Bluetooth radio uses a fast acknowledgment and frequency-hopping scheme to make the link robust. Bluetooth radio modules avoid interference from other signals by hopping to a new frequency after transmitting or receiving a packet. Compared with other systems operating in the same frequency band, the Bluetooth radio typically hops faster and uses shorter packets. Short packets and fast hopping limit the impact of domestic and professional microwave ovens, for example. Use of Forward Error Correction (FEC), with encoding optimized for an uncoordinated environment, limits the impact of random noise on long-distance links. The Bluetooth radio is therefore typically more robust than other systems.

Robustness is especially significant in instances where the packets are being used for data transmission, as opposed to voice applications. In a voice application, such as a conversation over a cell phone connection, the intended message can still be delivered if some of the packets are missing or if there is some interference or noise present. However, with data transmission, such as between a peripheral data storage device and a computer system, each data packet is important and cannot be lost.

Hence, the Bluetooth specification provides mechanisms for determining whether a data packet is successfully received, so that data packets that are lost or that contain errors introduced during transmission can be retransmitted until they are successfully received. For example, according to the Bluetooth specification, the receiving device sends an acknowledgment signal for each data packet to the transmitting device to indicate whether or not the data packet was successfully received. The transmitting device retransmits the data packet if no acknowledgment signal is sent, or if the acknowledgment signal indicates that the data packet was received but contained an error.

Devices used for voice applications, such as cell phones, are generally equipped with a Receiver Signal Strength Indicator (RSSI) that can be used to measure the strength of the incoming signal. The Bluetooth specification also provides for an optional RSSI for measuring the receiver signal strength. However, signal strength indication does not provide an adequate measure of data transfer integrity or reliability; that is, signal strength does not necessarily have a direct bearing on whether all data packets will be successfully received. For example, the receiving device may be getting a strong signal, but the signal may only contain noise, or perhaps the receiving or transmitting device has a fault that introduces errors into the data packets. Thus, even though the RSSI may indicate that the signal is strong, data packets may still be lost or received with errors. As a result, even with a strong signal, it may be necessary to retransmit data packets over and over until they are successfully received. Thus, while the RSSI described by the Bluetooth specification may be relevant for voice applications, it is not adequate for data transmission.

Clearly, it is not desirable to repeatedly retransmit data packets. The resources of both the receiving and transmitting devices are lied up sending and receiving the data packets, verifying whether they were accurately received (e.g., decoding, cyclic redundancy checking, etc.), and sending and receiving acknowledgment signals. Each time the data packet is retransmitted, the amount of effort associated with handling and processing the data packet must be duplicated.

Accordingly, a need exists for a device and/or method that can be used to measure the integrity of a wireless connection for data transmission. A need also exists for a device and/or method that can satisfy the above need and that can provide the measurement information to a user. In particular, a need exists for a system and/or method that can satisfy the above needs for Bluetooth-enabled devices.

DISCLOSURE OF THE INVENTION

The present invention provides a device and method that can be used to measure the integrity of a wireless connection for data transmission and to provide the measurement information to a user. In particular, the present invention provides a device and method that satisfies the above needs for Bluetooth-enabled devices.

In the present embodiment, the present invention pertains to a device and method for monitoring the data transfer integrity of a wireless connection between two devices, such as two Bluetooth-enabled transceivers. A number of data packets are transmitted from one of the two devices to the other in a first-occurring transmission. The receiving device indicates to the transmitting device whether any of the data packets were not successfully received. Any data packets that were not successfully received are retransmitted. The data transfer integrity of the wireless connection is measured, for example, by determining the number of data packets successfully transmitted in the first-occurring transmission relative to the total number of data packets transmitted and retransmitted. The measurement information can be provided to a user or to another device. Embodiments of the present invention can be implemented using either the receiving device or the transmitting device.

In one embodiment, acknowledgment signals are sent by the receiving device to the transmitting device to indicate whether or not the data packets were successfully received. In this embodiment, the acknowledgment signals associated with the data packets successfully transmitted in a first transmission can be counted, and the acknowledgment signals associated with any retransmitted data packets can also be counted. The measure of data packet transfer integrity can be determined using these counts.

In another embodiment, a data packet transmitted in a first transmission and a respective data packet subsequently retransmitted will have the same sequence number. In this embodiment, data packets having the same sequence number can be counted, and the measure of data packet transfer integrity can be determined using this count.

In still another embodiment, the receiving device performs a cyclic redundancy check to determine whether or not a data packet was successfully received. In this embodiment, the results of the cyclic redundancy check can be used to determine the measure of data packet transfer integrity.

In still another embodiment, the receiving device performs a header error check to determine whether or not header information for a data packet was successfully received. In this embodiment, the results of the header error check can be used to determine the measure of data packet transfer integrity.

In yet another embodiment, the Receiver Signal Strength Indicator (RSSI) for measuring signal strength is taken into account when determining the measure of data packet transfer integrity. That is, the RSSI can be factored into each of the embodiments described above to determine the measure of data packet transfer integrity.

In one embodiment, the measure of data packet transfer integrity can be provided to a user via a visual indication, and in another embodiment, the measure can be provided to a user via an audio indication. In yet another embodiment, the measure of data packet transfer integrity can be provided to another device such as a computer system.

Thus, in accordance with the present invention, the measure of data packet transfer integrity can be determined by the receiving device and/or the transmitting device, and provided to a user or another device. Consequently, corrective actions can be taken in order to improve the data transfer integrity of the wireless connection. For example, the relative orientation of the transmitting and receiving devices can be changed until the measure of data packet transfer integrity is maximized, or if a fault exists with one of the devices, the fault can be detected and corrected.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
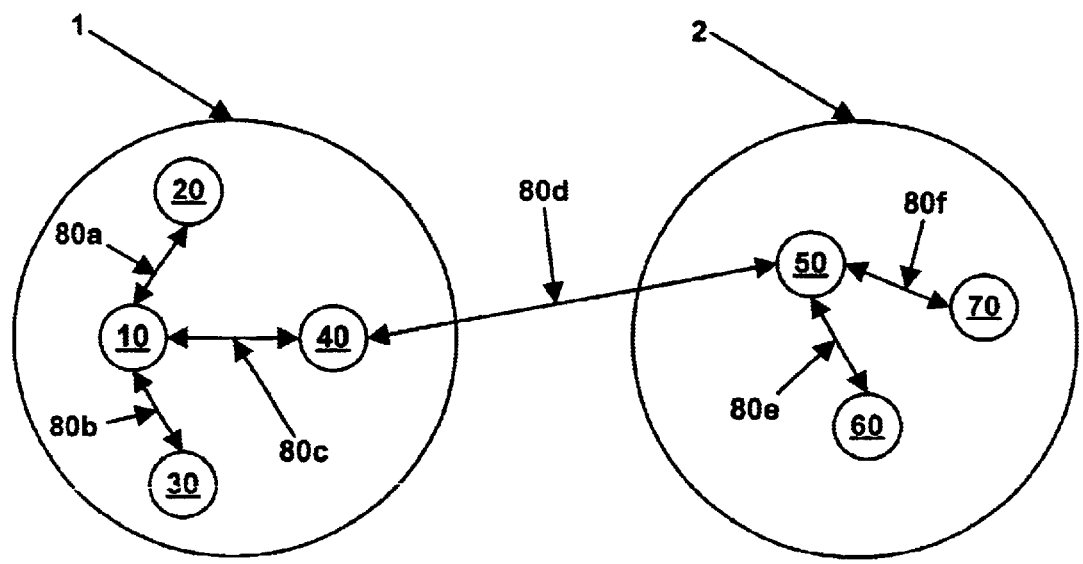
FIG. 1 illustrates one embodiment of a network of devices coupled using wireless connections in accordance with the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "indicating," "determining," "providing," "sending," "counting," "transmitting," "retransmitting," or the like, refer to the action and processes (e.g., processes 700 and 800 of FIGS. 7 and 8, respectively) of a computer system or similar intelligent electronic computing device, that manipulates and transforms data represented as physical (electronic) quantities within the computer system's registers and memories into other data similarly represented as physical quantities within the computer system memories or registers or other such information storage, transmission or display devices.

The present invention is discussed primarily in a context in which devices and systems are coupled using wireless links, and specifically with regard to devices and systems compliant with the Bluetooth technology. Bluetooth is the code name for a technology specification for small form factor, low-cost, short-range radio links between personal computers (PCs), mobile phones and other devices. The Bluetooth-technology allows cables that connect one device to another to be replaced with short-range radio links. However, it is appreciated that the present invention may be utilized with devices and systems coupled using technologies different from the Bluetooth technology, wireless or otherwise.

FIG. 1 illustrates the topology of a network of devices coupled using wireless connections in accordance with one embodiment of the present invention. In the parlance of Bluetooth, a collection of devices connected in a Bluetooth system are referred to as a "piconet" or a "subnet." A piconet starts with two connected devices, such as a computer system and a cellular phone, and may grow to eight connected devices. All Bluetooth devices are peer units; however, when establishing a piconet, one unit will act as a master and the other(s) as slave(s) for the duration of the piconet connection.

A Bluetooth system supports both point-to-point and point-to-multi-point connections. Several piconets can be established and linked together in a "scatternet," where each piconet is identified by a different frequency hopping sequence. All devices participating on the same piconet are synchronized to their respective hopping sequence.

Accordingly, devices 10, 20, 30 and 40 are coupled in piconet 1 using wireless connections 80a–c. Similarly, devices 50, 60 and 70 are coupled in piconet 2 using wireless connections 80e–f. Piconet 1 and piconet 2 are coupled using wireless connection 80d. Devices 10–70 can be printers, personal digital assistants (PDAs), desktop computer systems, laptop computer systems, cell phones, fax machines, keyboards, joysticks and virtually any other digital device. In the present embodiment, devices 10–70 are Bluetooth devices; that is, they are equipped with a Bluetooth radio transceiver, or they are adapted to communicate with Bluetooth devices ("Bluetooth-enabled"). That is, the Bluetooth radio transceiver may be integrated into a device, or it may be coupled to a device.

Figure 2:
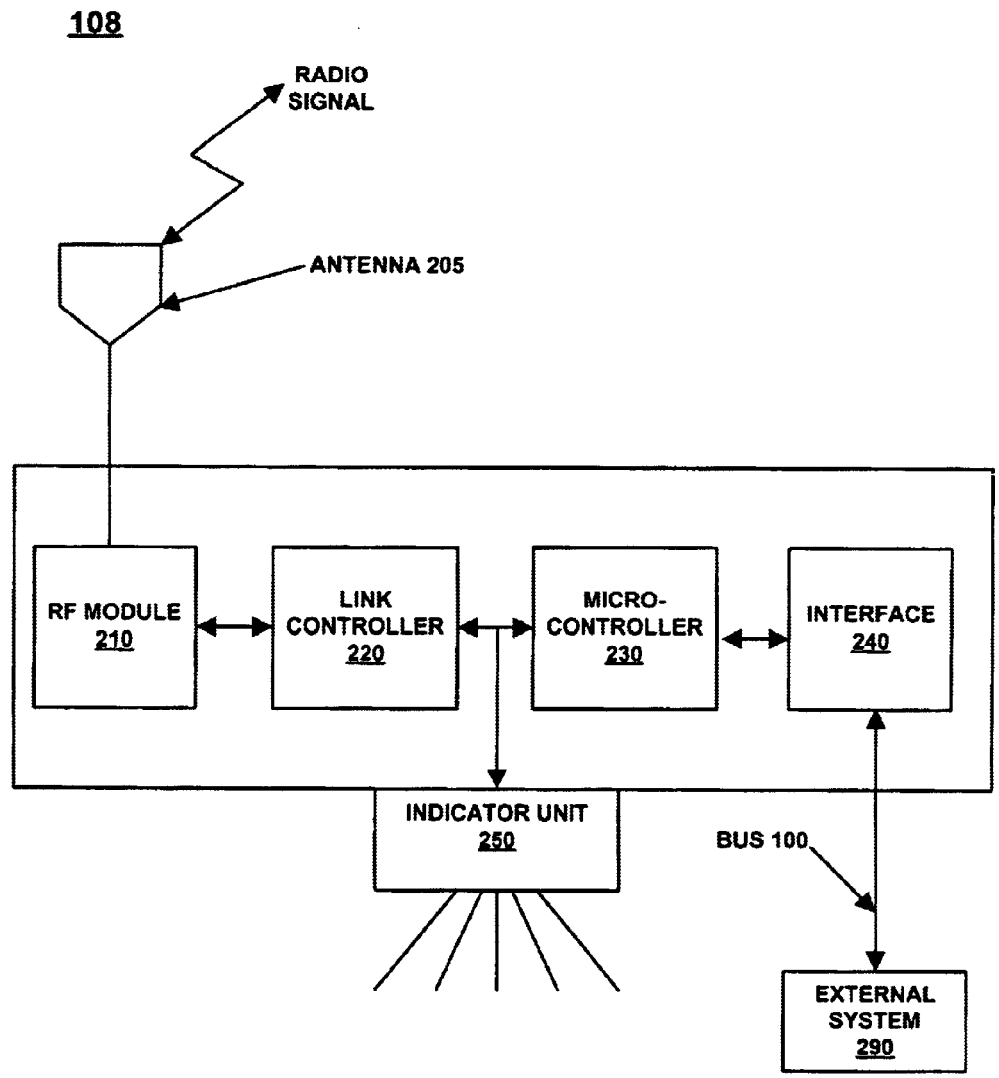
FIG. 2 is a block diagram showing one embodiment of a wireless transceiver in accordance with the present invention.

FIG. 2 is a block diagram of one embodiment of a transceiver 108 in accordance with the present invention. In a preferred embodiment (the "Bluetooth embodiment"), transceiver 108 is a Bluetooth device comprising a digital component (e.g., a Bluetooth controller) and an analog component (e.g., a Bluetooth radio).

In the present embodiment, transceiver 108 comprises an antenna 205 for receiving or transmitting radio signals, a radio frequency (RF) module 210, a link controller 220, a microcontroller (or central processing unit) 230, and an external interface 240. In the present embodiment, transceiver 108 is coupled by a system bus 100 to an external device 290 (e.g., a host device such as a computer system or similar intelligent electronic device, a PDA, a printer, a fax machine, etc.). However, it is appreciated that in another embodiment, transceiver 108 may be integrated into external device 290.

In the Bluetooth embodiment, RF module 210 is a Bluetooth radio. The Bluetooth radio can provide: a bridge to existing data networks, a peripheral interface, and a mechanism to form piconets of connected devices away from fixed network infrastructures (see FIG. 1).

Bluetooth radios operate in the ISM (Industrial, Scientific, Medical) band at 2.4 GHz. A frequency hop transceiver is applied to combat interference and fading. Bluetooth uses a packet-switching protocol based on a frequency hop scheme with 1600 hops/second. Slots can be reserved for synchronous packets. A packet nominally covers a single slot, but can be extended to cover up to five slots. Each packet is transmitted in a different hop frequency. The entire available frequency spectrum is used with 79 hops of one (1) MHz bandwidth, defined analogous to the IEEE (Institute of Electronic and Electrical Engineering) 802.11 standard. The frequency hopping scheme is combined with fast ARQ (Automatic Repeat Request), cyclic redundancy check (CRC) and Forward Error Correction (FEC) for data.

In the present embodiment, link controller 220 is a hardware digital signal processor for performing baseband processing as well as other functions such as Quality-of-Service, asynchronous transfers, synchronous transfers, audio coding, and encryption.

In one embodiment, microcontroller 230 is an application specific integrated circuit (ASIC). In the Bluetooth embodiment, microcontroller 230 is a separate central processing unit (CPU) core for managing transceiver 108 and for handling some inquiries and requests without having to involve the host device. In the Bluetooth embodiment, microcontroller 230 runs software that discovers and communicates with other Bluetooth devices via the Link Manager Protocol (LMP). The LMP provides a number of services including sending and receiving of data, inquiring of and reporting a name or device identifier, making and responding to link address inquiries, connection setup, authentication, and link mode negotiation and setup. The LMP also can be used to place transceiver 108 in "sniff" mode, "hold" mode, "park" mode or "standby" mode.

In the present embodiment, before any connections between Bluetooth devices are created, all devices are in standby mode. In this mode, an unconnected unit "listens" for messages at a regular rate (e.g., every 1.28 seconds) on a set of hop frequencies defined for that unit. The hold mode is a power saving mode that can be used for connected units if no data need to be transmitted. The sniff and park modes are also low power modes. In the sniff mode, a device listens to the piconet at a reduced rate (relative to the regular rate), thus reducing its duty cycle. The sniff interval is programmable and depends on the application. In the park mode, a device is still synchronized to the piconet but does not participate in the traffic.

A connection between devices is made by a "page" message if the address is already known, or by an "inquiry" message followed by a subsequent page message if the address is unknown.

With reference still to FIG. 2, in the present embodiment, interface 240 is for coupling transceiver 108 to external device 290 in a suitable format (e.g., USB, PCMCIA, PCI, CardBus, PC Card, etc.). In the present embodiment, interface 240 runs software that allows transceiver 108 to interface with the operating system of external device 290.

In accordance with the present invention, in one embodiment, transceiver 108 includes an indicator unit 250. Indicator unit 250 may be a visual display screen or a set of indicator lights, or it may include an audio signal generator. In these embodiments, indicator unit 250 is used for providing a visual or audio indication of a measure of data packet transfer integrity to a user. The measure of data packet transfer integrity of the present invention is different from the signal strength typically indicated using a Receiver Signal Strength Indicator (RSSI). However, it is appreciated that in one embodiment the RSSI can be taken into account when determining the measure of data packet transfer integrity. A definition of the measure of data packet transfer integrity and a description of how it is determined are provided in conjunction with FIGS. 6, 7 and 8 below.

Figure 3:
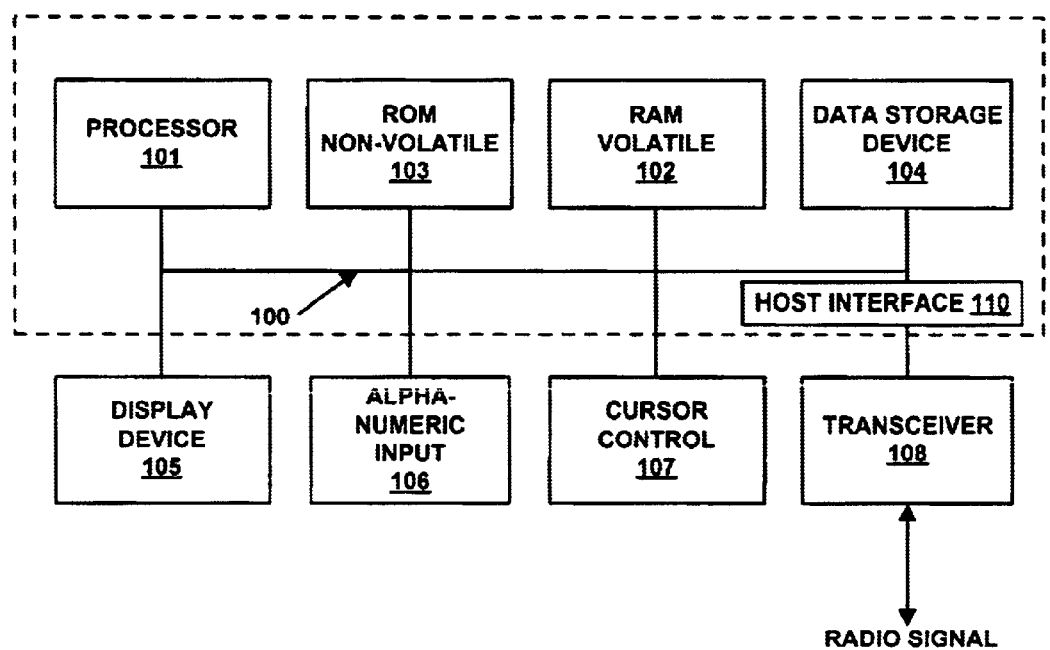
FIG. 3 is a block diagram of an exemplary computer system coupled to a wireless transceiver in accordance with one embodiment of the present invention.

FIG. 3 is a block diagram of one embodiment of a host device (e.g., external device 290 of FIG. 2) that can be used in accordance with the present invention. In this embodiment, the host device is a computer system 190; however, it is appreciated that the host device may be another type of intelligent electronic device, a PDA, a printer, a fax machine, etc.

In general, with reference to FIG. 3, computer system 190 comprises bus 100 for communicating information, processor 101 coupled with bus 100 for processing information and instructions, random access (volatile) memory (RAM) 102 coupled with bus 100 for storing information and instructions for processor 101, read-only (non-volatile) memory (ROM) 103 coupled with bus 100 for storing static information and instructions for processor 101, an optional data storage device 104 such as a magnetic or optical disk and disk drive coupled with bus 100 for storing information and instructions, an optional user output device such as display device 105 coupled to bus 100 for displaying information to the computer user, an optional user input device such as alphanumeric input device 106 including alphanumeric and function keys coupled to bus 100 for communicating information and command selections to processor 101, and an optional user input device such as cursor control device 107 coupled to bus 100 for communicating user input information and command selections to processor 101.

Display device 105 utilized with computer system 190 may be a liquid crystal device, cathode ray tube, or other display device suitable for creating graphic images and alphanumeric characters recognizable to the user. Cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control 107 also may be directed and/or activated via input from the keyboard using special keys and key sequence commands. Alternatively, the cursor may be directed and/or activated via input from a number of specially adapted cursor directing devices.

Transceiver 108 can be coupled to computer system 190 using any of a variety of physical bus interfaces (e.g., host interface 110), including but not limited to a Universal Serial Bus (USB) interface, Personal Computer (PC) Card interface, CardBus or Peripheral Component Interconnect (PCI) interface, Personal Computer Memory Card International Association (PCMCIA) interface, or RS-232 interface.

Figure 4:
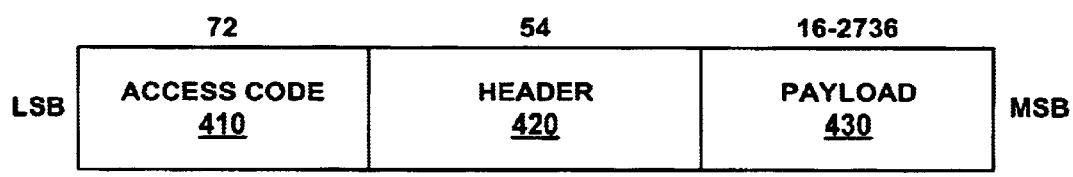
FIG. 4 illustrates a data packet format in accordance with one embodiment of the present invention.

FIG. 4 illustrates a format for a data packet 400 in accordance with one embodiment of the present invention. In the present embodiment, packet 400 consists of three fields: a 72-bit access code 410, a 54-bit header 420, and a payload 430 of variable length (2–342 bytes, or 16–2736 bits). Packet 400 may consist of the access code only, a shortened version of the access code, the access code and the header, or the access code, header and payload.

Access code 410 is used for synchronization, offset compensation and identification. Access code 410 identifies all packets exchanged on the channel of a piconet (e.g., piconet 1 and 2 of FIG. 1). All packets sent in the same piconet are preceded by the same channel access code.

Payload 430 carries user information and control information. In a data packet, payload 430 also contains data. A cyclic redundancy check (CRC) is added to each payload that contains data to verify the success of the reception of the data packet.

Figure 5:
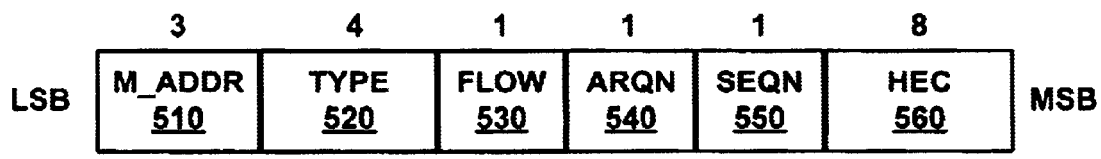
FIG. 5 illustrates a header format in a data packet in accordance with one embodiment of the present invention.

FIG. 5 illustrates a format of header 420 in a data packet 400 (FIG. 4) in accordance with one embodiment of the present invention. Header 420 contains lower-level link control information. In the present embodiment, header 420 consists of six (6) fields: a 3-bit sub address (M_ADDR 510), a 4-bit packet type (TYPE 520), a 1-bit flow control bit (FLOW 530), a 1-bit acknowledge indication (ARQN 540), a 1-bit sequence number (SEQN 550), and an 8-bit header error check (HEC 560). In this embodiment, the total header information consists of 18 bits, but it is protected with a ⅓ forward-error correction (FEC) coding resulting in a 54-bit header length.

In the present embodiment, M_ADDR (Medium Access Control Address) 510 represents a Medium Access Control (MAC) address and is used to distinguish between the participant devices of a piconet. Typically, several slave devices ("slaves") are connected to a single master device ("masters"). To identify each slave separately, each slave is assigned a temporary MAC address for the duration of the connection. Packets exchanged between the master and a slave all carry the M_ADDR of this slave. The all-zero address is reserved for broadcasting purposes.

In the Bluetooth embodiment, a link type is used to define what type of packets can be used on a particular link. The Bluetooth technology supports two link types: Synchronous Connection Oriented (SCO) used primarily for voice, and Asynchronous Correctionless (ACL) used primarily for data. In the present embodiment, sixteen different types of packets can be distinguished. The 4-bit TYPE 520 code specifies which packet type is used. The interpretation of the TYPE 520 code depends on the physical link type associated with the packet. First, it is determined whether the packet is a SCO link packet or an ACL link packet. Then, it is determined which of the SCO packet types or ACL packet types is being dealt with. The TYPE 520 code also reveals how many slots the current packet will occupy.

In the present embodiment, the FLOW 530 bit is used for flow control over the ACL link. When the receiver buffer for the ACL connection in the receiving device is full and is not emptied by the link support unit, a STOP indication (FLOW=0) is returned to stop the transmission of data temporarily. In this embodiment, the STOP signal only concerns ACL packets, and so packets including only link control (POLL and NULL packets) or SCO packets can still be received. When the receive buffer is empty, a GO indication (FLOW=1) is returned. When no packet is received or the received header is in error, a GO is assumed implicitly.

In the present embodiment of the present invention, the ARQN 540 bit is an acknowledge field to inform the transmitting device whether the reception of the data packet in the preceding slot was successful (ARQN=1) or unsuccessful (ARQN=0). When no valid ARQN field is received, ARQN=0 is assumed implicitly. ARQN=0 is the default value. ARQN 540 is piggy-backed in the return data packet (e.g., an acknowledge signal) sent to the transmitting device by the receiving device. The success of the reception is checked by the receiving device by means of the CRC which is added to each payload that contains data. In the present embodiment, an unnumbered ARQ scheme is used, which means that ARON 540 relates to the packet just received.

In the present embodiment, SEQN (Sequential Numbering Scheme) 550 is a numbering field to distinguish new packets from retransmitted packets. The SEQN 550 bit is toggled by the transmitting device for each new packet transmission. A retransmitted packet keeps the same SEQN 550 bit. If two consecutive packets are received with the same SEQN 550 bit, the second packet is ignored by the receiving device.

In the present embodiment, each header has a header error check (HEC) 560 so that the receiving device can check the header integrity. If the HEC 560 does not check, the entire packet is disregarded by the receiving device.

Figure 6:
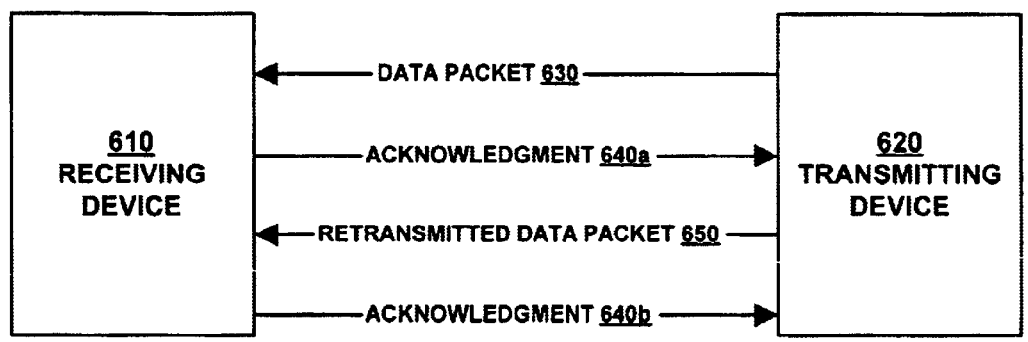
FIG. 6 diagrams a transfer of data packets between receiving and transmitting devices in accordance with one embodiment of the present invention.

FIG. 6 diagrams a transfer of data packets between receiving device 610 and transmitting device 620 in accordance with one embodiment of the present invention. In one embodiment, receiving device 610 and transmitting device 620 are Bluetooth devices or Bluetooth-enabled devices.

In the present embodiment, an unnumbered ARQ scheme is applied in which a data packet transmitted in one slot is directly acknowledged by the receiving device in the next slot. For a data transmission to be acknowledged (ARQN=1), both the HEC 560 and the CRC must check; otherwise a negative acknowledge NAK (ARQN=0) is returned (refer to FIG. 5).

Continuing with reference to FIG. 6 and with reference also to FIGS. 4 and 5, in the present embodiment, data packet 630 is received by receiving device 610. Data packet 630 has a data payload 430 including a CRC. In one embodiment, link controller 220 (FIG. 2) of receiving device 610 first checks the HEC 560 in data packet 630. If the HEC 560 checks, the payload CRC is checked. If the CRC checks as well, the ARQN 540 field in the return packet (e.g., acknowledgment 640a) is set to a binary 1 (ARQN=1). Otherwise the ARQN 540 field in acknowledgment 640a is set to binary zero (ARQN=0). When the HEC 560 and CRC check, the payload 430 is accepted, provided SEQN 550 in the packet header 420 differs from the SEQN 550 in the last successfully received packet (e.g., the data packet preceding data packet 630). Otherwise the payload 430 is discarded.

On reception of acknowledgment 640a, in one embodiment, link controller 220 (FIG. 2) of transmitting device 620 first checks the HEC of acknowledgment 640a. If the HEC checks, it reads the ARQN field in the header of acknowledgment 640a. If ARQN=1, the sender toggles SEQN 550 in the next data packet and transmits that data packet in the next transmit slot. If the HEC does not check or a NAK (ARQN=0) has been received, SEQN 550 is not toggled and the previous payload 430 is retransmitted (that is, data packet 630 is resent as retransmitted data packet 650). Upon receipt of retransmitted data packet 650 by receiving device 610, the HEC and CRC are checked, the SEQN bit is read, and acknowledgment 640b is sent. The contents of acknowledgment 640b are dependent on the HEC and CRC results, as described above. This scheme is repeated for each data packet until all data packets are successfully transmitted and received.

The ARQ scheme described above is carried out separately between the master and each slave. The master receives acknowledgment data of master-to-slave information directly in the slave-to-master slot following the master-to-slave slot. Acknowledgment data of slave-to-master information are received in the next master-to-slave slot in which the master addresses the slave.

In accordance with the present invention, a measure of data packet transfer integrity is determined by the receiving device and/or the transmitting device. In the present embodiment, the measure of data packet transfer integrity is defined as the ratio of the number of data packets received successfully (that is, without error) to the total number of data packets transmitted and retransmitted. For example, if "s" is the number of data packets successfully sent and "r" the number of data packets that were retransmitted, then the measure of data packet transfer integrity is equal to $s/(r+s)$. However, it is appreciated that in other embodiments, the measure of data packet transfer integrity may be defined differently. For example, the measure of data packet transfer integrity may instead be defined as $r/(r+s)$ or $1-[r/(r+s)]$. If the total number ("t") of data packets transmitted are counted, the measure of data packet transfer integrity may be defined as $s/t$, $r/t$, etc.

Regardless of the definition used, the measure of data packet transfer integrity is sufficient for deriving "s." That is, in accordance with the present invention, the measure of data packet transfer integrity is sufficient for representing the rate at which data packets are successfully transmitted on a first attempt. Also in accordance with the present invention, the measurement information can be provided to a user or another device, so that actions can be taken to maximize data transfer integrity and reliability. The measure of data packet transfer integrity of the present invention is different from the signal strength typically indicated using an RSSI. However, it is appreciated that in one embodiment the RSSI can be taken into account when determining the measure of data packet transfer integrity. Additional information is provided in conjunction with FIGS. 7 and 8.

Figure 7:
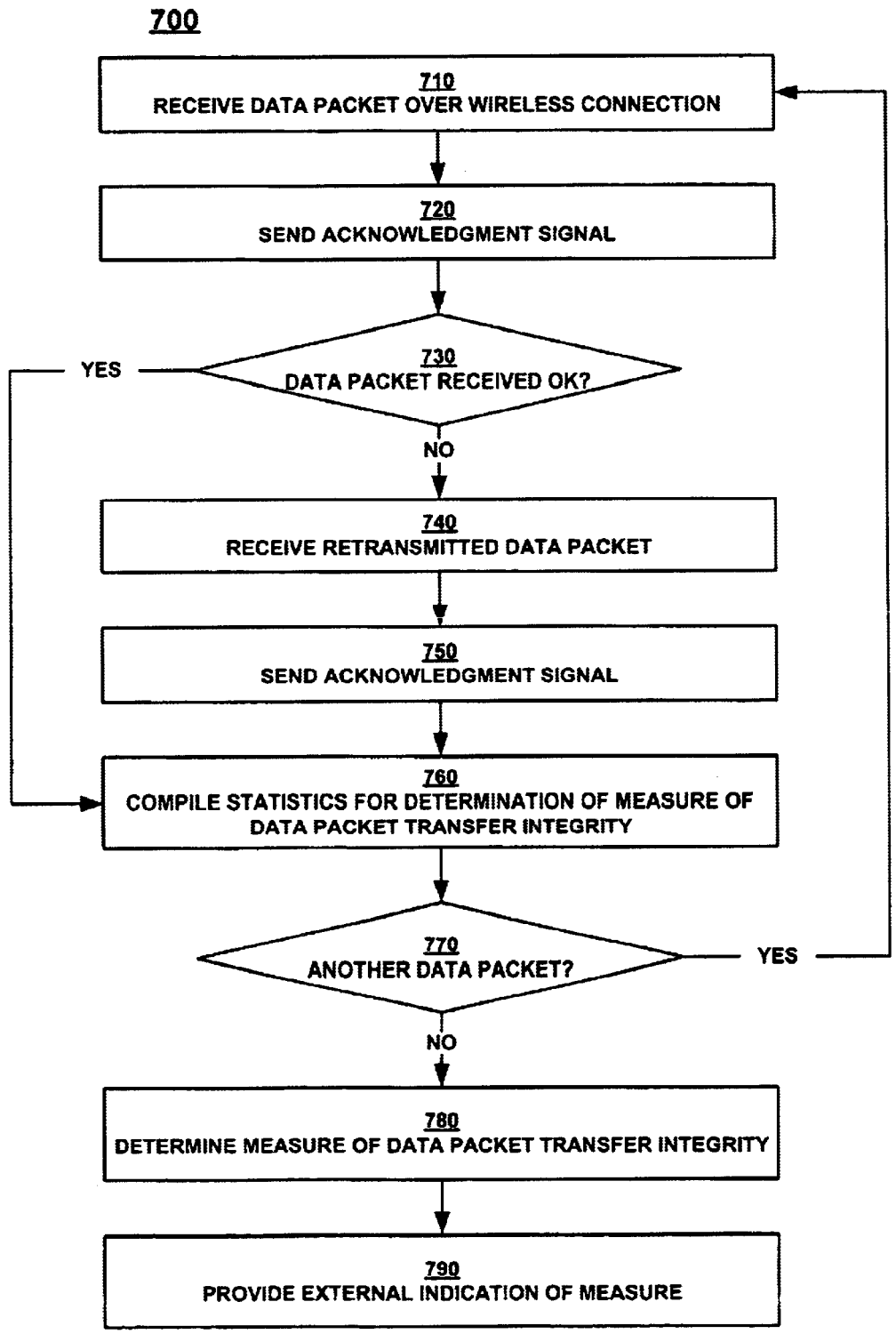
FIG. 7 is a flowchart of the steps in a process for determining a measure of data packet transfer integrity in a receiving device in accordance with one embodiment of the present invention.

FIG. 7 is a flowchart of the steps in a process 700 for determining the measure of data packet transfer integrity in a receiving device (e.g., receiving device 610 of FIG. 6) in accordance with one embodiment of the present invention. In the present embodiment, receiving device 610 is a Bluetooth device or a Bluetooth-enabled device.

In step 710 of FIG. 7, data packet 630 is received by receiving device 610 from another Bluetooth device (e.g., transmitting device 620 of FIG. 6) over a wireless connection. As described above in conjunction with FIG. 6, the HEC 560 (FIG. 5) is checked by receiving device 610, and if that checks, the CRC of payload 430 (FIG. 4) is checked.

In step 720 of FIG. 7, an acknowledge signal (e.g., acknowledgment 640a of FIG. 6) is sent from receiving device 610 to transmitting device 620. If both the HEC 560 and the CRC of payload 430 are correct, then acknowledgment 640a indicates that data packet 630 was successfully received. If either HEC 560 or the CRC of payload 430 does not check, then acknowledgment 640*a* indicates that data packet 630 was not successfully received.

In step 730 of FIG. 7, if data packet 630 was received successfully, then process 700 proceeds to step 760. If data packet 630 was not successfully received, then it is retransmitted (as retransmitted data packet 650 of FIG. 6) from transmitting device 620 and received by receiving device 610 (step 740). As described above in conjunction with FIG. 6, in this case, both data packet 630 and retransmitted data packet 650 have the same sequence number SEQN 550 (FIG. 5). For retransmitted data packet 650, the HEC 560 is checked by receiving device 610, and if that checks, the CRC of payload 430 is checked.

In step 750 of FIG. 7, an acknowledge signal (e.g. acknowledgment 640*b* of FIG. 6) is sent from receiving device 610 to transmitting device 620. If both the HEC 560 and the CRC of payload 430 are correct, then acknowledgment 640*b* indicates that retransmitted data packet 650 was successfully received. If either HEC 560 or the CRC of payload 430 does not check, then acknowledgment 640*b* indicates that retransmitted data packet 650 was not successfully received. For simplicity of discussion, it is assumed that retransmitted data packet 650 is successfully received in step 740; however, it is appreciated that a data packet can be retransmitted more than once if necessary, until it is successfully received.

In step 760 of FIG. 7, the statistics that will be used to determine the measure of data packet transfer integrity are compiled. In one embodiment, a count ("s") of the data packets successfully received in the first-occurring transmission (that is, in step 710) is performed. Similarly, a count ("r") of each occurrence of a retransmitted data packet is also performed.

In one embodiment, the count is accomplished by counting the number of acknowledgments 640*a* (to determine "s"), and the number of acknowledgments 640*b* (to determine "r"), because these acknowledgments are associated with, respectively, the data packets successfully received in the first-occurring transmission and the data packets that are retransmitted. If a data packet is retransmitted more than once, this will be reflected in the final value of "r."

In another embodiment, the count to determine "r" is accomplished by counting the number of occurrences in which data packets share the same sequence number (SEQN 550), because a data packet not successfully received and a respective retransmitted data packet will have the same sequence number.

In another embodiment, the count to determine "r" is accomplished by counting the number of occurrences in which a data packet fails the cyclic redundancy check. Similarly, in another embodiment, the count to determine "r" is accomplished by counting the number of occurrences in which a data packet fails the header error check.

It is appreciated that the present invention is not limited to the embodiments described above, and that there may be other mechanisms that can be implemented in accordance with present invention in order to determine the number of data packets that are successfully transmitted in the first-occurring transmission, the number of data packets that are retransmitted, and/or the total number of data packets transmitted and retransmitted.

In step 770 of FIG. 7, process 700 (specifically, steps 710 through 760) is repeated for each data packet in the data stream or transaction.

In step 780, the measure of data packet transfer integrity is determined based on the statistics compiled in step 760.

As described above, in one embodiment, the measure is a value representing the number of data packets successfully received in a first-occurring transmission (step 710) relative to the total number of data packets transmitted and retransmitted (steps 710 and 740). It is appreciated that, in other embodiments, a different measure may be used to represent the integrity and reliability of data transfer over the wireless connection, as described previously herein. For example, in one embodiment, the measure of data packet transfer integrity is determined as described above, and in addition takes into account the RSSI; that is, the RSSI is factored into the calculation for determining the measure of data packet transfer integrity.

In step 790, in one embodiment, an indication of the measure of data packet transfer integrity is provided to a user (via indicator unit 250 of FIG. 2). In one embodiment, the user is provided with a visual display. In another embodiment, the user is provided with an audio signal.

Currently, the Bluetooth specification specifies that the raw bit error rate should be less than or equal to 0.1 percent. If the measure of data packet transfer integrity indicates that the level of retransmitted data packets is unsatisfactory, then the user can take corrective actions in order to improve or maximize the rate at which data packets are successfully received in a first-occurring transmission, or to minimize the rate at which data packets need to be retransmitted. For example, the user can move receiving device 610 and transmitting device 620 closer together, or change their relative orientation.

In another embodiment, the indication of the measure of data packet transfer integrity is provided electronically to an external device (e.g., computer system 190 of FIG. 3 or some other type of intelligent device such as a PDA). The external device can then execute predetermined instructions, depending on whether or not the measure is satisfactory. For example, the external device can alert a user or suspend further transmissions for a period of time.

It is appreciated that receiving device 610 can be a master device and, as such, may be receiving data packets from a number of different slave devices at any given time. In this case, receiving device 610 can track the different incoming signals separately, and determine the measure of data transfer integrity for each. Accordingly, indicator unit 250 can be used to indicate the measure of data transfer integrity for a selected connection, or it can be used to indicate this information on a rotating basis for each connection. In the case where the measurement information is provided to an external device such as a computer system, typically it is possible to display multiple instances at the same time.

Figure 8:
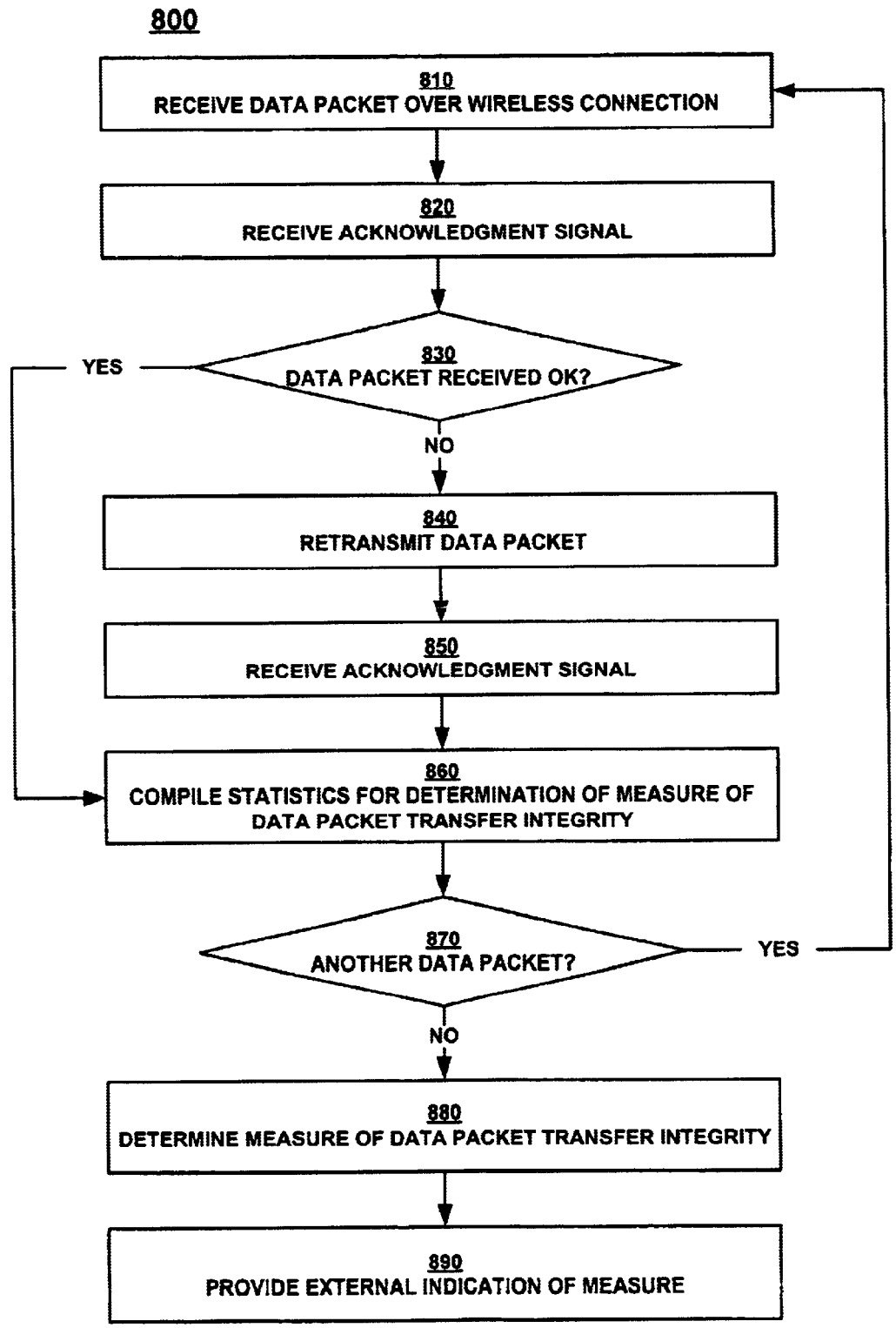
FIG. 8 is a flowchart of the steps in a process for determining a measure of data packet transfer integrity in a transmitting device in accordance with one embodiment of the present invention.

FIG. 8 is a flowchart of the steps in a process 800 for determining a measure of data packet transfer integrity in a transmitting device (e.g., transmitting device 620 of FIG. 6) in accordance with one embodiment of the present invention. In the present embodiment, transmitting device 620 is a Bluetooth device or a Bluetooth-enabled device.

In step 810 of FIG. 8, data packet 630 is transmitted by transmitting device 620 to another Bluetooth device (e.g., receiving device 610 of FIG. 6) over a wireless connection.

In step 820 of FIG. 8, an acknowledge signal (e.g., acknowledgment 640*a* of FIG. 6) associated with data packet 630 is received by transmitting device 620. If both the HEC 560 and the CRC of payload 430 are correct, then acknowledgment 640*a* indicates that data packet 630 was successfully transmitted. If either HEC 560 or the CRC of payload 430 does not check, then acknowledgment 640*a* indicates that data packet 630 was not successfully transmitted.

In step 830 of FIG. 8, if data packet 630 was transmitted successfully, then process 800 proceeds to step 860. If data packet 630 was not successfully transmitted, then it is retransmitted (as retransmitted data packet 650 of FIG. 6) from transmitting device 620 (step 840). As described above in conjunction with FIG. 6, in this case, both data packet 630 and retransmitted data packet 650 have the same sequence number SEQN 550 (FIG. 5).

In step 850 of FIG. 8, an acknowledge signal (e.g. acknowledgment 640b of FIG. 6) associated with retransmitted data packet 650 is received by transmitting device 620. If both the HEC 560 and the CRC of payload 430 are correct, then acknowledgment 640b indicates that retransmitted data packet 650 was successfully transmitted. If either HEC 560 or the CRC of payload 430 does not check, then acknowledgment 640b indicates that retransmitted data packet 650 was not successfully transmitted. For simplicity of discussion, it is assumed that retransmitted data packet 650 is successfully transmitted in step 840; however, it is appreciated that a data packet can be retransmitted more than once if necessary, until it is successfully transmitted.

In step 860 of FIG. 8, the statistics that will be used to determine the measure of data packet transfer integrity are compiled. In one embodiment, a count ("s") of the data packets successfully transmitted in the first-occurring transmission (that is, in step 810) is performed. Similarly, a count ("r") of each occurrence of a retransmitted data packet is also performed.

In one embodiment, the count is accomplished by counting the number of acknowledgments 640a (to determine "s"), and the number of acknowledgments 640b (to determine "r"), because these acknowledgments are associated with, respectively, the data packets successfully transmitted in the first-occurring transmission and the data packets that are retransmitted. If a data packet is retransmitted more than once, this will be reflected in the final value of "r."

In another embodiment, the count to determine "r" is accomplished by counting the number of occurrences in which data packets share the same sequence number (SEQN 550), because a data packet not successfully transmitted and a respective retransmitted data packet will have the same sequence number.

In yet another embodiment, transmitting device 620 can count each data packet that it transmits or retransmits as it is transmitted, thereby obtaining a count of the total number of data packets in a stream or transaction. It would then only be necessary for transmitting device 620 to separately count either the number of data packets successfully transmitted in a first-occurring transmission, or the number of data packets retransmitted, because one of these values can be derived by subtracting the other from the total.

It is appreciated that the present invention is not limited to the embodiments described above, and that there may be other mechanisms that can be implemented in accordance with present invention in order to determine the number of data packets that are successfully transmitted in the first-occurring transmission, the number of data packets that are retransmitted, and/or the total number of data packets transmitted.

In step 870 of FIG. 8, process 800 (specifically, steps 810 through 860) is repeated for each data packet in the data stream or transaction.

In step 880, the measure of data packet transfer integrity is determined based on the statistics compiled in step 860. As described above, in one embodiment, the measure is a value representing the number of data packets successfully transmitted in a first-occurring transmission (step 810) relative to the total number of data packets transmitted (steps 810 and 840). It is appreciated that, in other embodiments, a different measure may be used to represent the integrity and reliability of data transfer over the wireless connection. For example, in one embodiment, the measure of data packet transfer integrity is determined as described above, and in addition takes into account the RSSI; that is, the RSSI is factored into the calculation for determining the measure of data packet transfer integrity.

In step 890, in one embodiment, an indication of the measure of data packet transfer integrity is provided to a user (via indicator unit 250 of FIG. 2). In one embodiment, the user is provided with a visual display. In another embodiment, the user is provided with an audio signal. In yet another embodiment, the indication of the measure of data packet transfer integrity is provided electronically to an external device (e.g., computer system 190 of FIG. 3 or some other type of intelligent device such as a PDA). Appropriate actions can then be taken to improve the data packet transfer integrity if necessary.

In summary, the present invention provides a device and method that can be used to measure the integrity of a wireless connection for data transmission. The present invention can be implemented in either the receiving device or in the transmitting device, in particular in Bluetooth-enabled devices. In addition, in accordance with the present invention, the measurement information can be provided to a user or to an external device. As a result, corrective actions can be taken when needed in order to improve the data transmission.

The preferred embodiment of the present invention, method and device for indicating wireless connection integrity, is thus described. While the present invention has been described in particular embodiments, it should be appreciated that the present invention should not be construed as limited by such embodiments, but rather construed according to the following claims.

What is claimed is:

1. In a device having a transceiver, a method for monitoring the integrity of a wireless connection, said method comprising:
   a) receiving a number of data packets transmitted over said wireless connection;
   b) indicating whether any of said data packets were not successfully received in said step a);
   c) receiving retransmitted data packets, said retransmitted data packets comprising said data packets not successfully received in said step a);
   d) determining a first number of data packets received in said step a) and a second number of data packets retransmitted in said step c) by counting data packets having a same sequence number to determine said second number, wherein said same sequence number is included in each data packet received in said step a) and in a respective retransmitted data packet received in said step c); and
   e) determining a measure of data packet transfer integrity based on said first number and said second number.

2. The method as recited in claim 1 wherein said transceiver is a Bluetooth-enabled device.

3. The method as recited in claim 1 further comprising: providing an indication of said measure of data packet transfer integrity to a user.

4. The method as recited in claim 3 wherein said indication provided to said user is a visual display.

5. The method as recited in claim 3 wherein said indication provided to said user is an audio indication.

6. The method as recited in claim 1 further comprising:
providing an indication of said measure of data packet transfer integrity to an intelligent device, said intelligent device comprising a processor adapted to interpret said indication and execute instructions in response to said indication.

7. The method as recited in claim 1 further comprising:
sending an acknowledge signal for each data packet received, said acknowledge signal indicating whether a data packet was successfully received; and
counting acknowledge signals associated with data packets successfully received in said step a) to determine said first number.

8. The method as recited in claim 1 further comprising:
performing a cyclic redundancy check, said cyclic redundancy check for determining whether a data packet was successfully received.

9. The method as recited in claim 1 further comprising:
performing a header error check, said header error check for determining whether header information in a data packet was successfully received.

10. The method as recited in claim 1 further comprising:
determining a measure of signal strength for said wireless connection; and
using said measure of signal strength in said step e).

11. In a device having a transceiver, a method for monitoring the integrity of a wireless connection, said method comprising:
a) transmitting a number of data packets over said wireless connection;
b) receiving an acknowledge signal for each data packet, said acknowledge signal indicating whether a data packet was successfully received;
c) retransmitting any data packets not successfully received in said step a);
d) determining a first number of data packets transmitted in said step a) and a second number of data packets transmitted in said step c) by counting data packets having a same sequence number to determine said second number, wherein said same sequence number is included in each data packet transmitted in said step a) and in a respective data packet retransmitted in said step c); and
e) determining a measure of data packet transfer integrity based on said first number and said second number.

12. The method as recited in claim 11 wherein said transceiver is a Bluetooth-enabled device.

13. The method as recited in claim 11 further comprising:
providing an indication of said measure of data packet transfer integrity to a user.

14. The method as recited in claim 13 wherein said indication provided to said user is a visual display.

15. The method as recited in claim 13 wherein said indication provided to said user is an audio indication.

16. The method as recited in claim 11 further comprising:
providing an indication of said measure of data packet transfer integrity to an intelligent device, said intelligent device comprising a processor adapted to interpret said indication and execute instructions in response to said indication.

17. The method as recited in claim 11 further comprising:
counting acknowledge signals associated with data packets successfully transmitted in said step a) to determine said first number.

18. A transceiver comprising:
a module for transmitting and receiving data packets via a wireless connection; and
a central processing unit coupled to said module;
said transceiver configured to determine whether said data packets were successfully received in a first-occurring transmission, wherein data packets not successfully received are received in a subsequent transmission;
said transceiver further configured to determine a measure of data packet transfer integrity, wherein said measure is sufficient for determining a number of data packets successfully received in said first-occurring transmission and a total number of data packets received in said first-occurring transmission and said subsequent transmission, wherein said transceiver is configured to count data packets having a same sequence number, wherein said same sequence number is included in each data packet received in said first-occurring transmission and in a respective data packet received in said subsequent transmission;
wherein said transceiver determines said measure of data packet transfer integrity using said count.

19. The transceiver of claim 18 wherein said module is a Bluetooth-enabled device.

20. The transceiver of claim 18 further comprising:
an indicator unit configured to provide an indication of said measure of data packet transfer integrity to a user.

21. The transceiver of claim 20 wherein said indicator unit provides a visual display of said measure of data packet transfer integrity.

22. The transceiver of claim 20 wherein said indicator unit provides an audio indication of said measure of data packet transfer integrity.

23. The transceiver of claim 18 wherein an indication of said measure of data packet transfer integrity is provided to an intelligent device communicatively coupled to said transceiver, said intelligent device comprising a processor configured to interpret said indication and execute instructions in response to said indication.

24. The transceiver of claim 18 wherein said transceiver is configured to perform a first count of acknowledge signals associated with said data packets successfully received in said first-occurring transmission and a second count of acknowledge signals associated with said data packets received in said subsequent transmission, said acknowledge signals for indicating whether a data packet was successfully received.

25. The transceiver of claim 18 wherein said transceiver is configured to perform a cyclic redundancy check, said cyclic redundancy check for determining whether a data packet was successfully received.

26. The transceiver of claim 18 wherein said transceiver is configured to perform a header error check, said header error check for determining whether header information in a data packet was successfully received.

27. The transceiver of claim 18 wherein said transceiver is configured to determine a measure of signal strength for said wireless connection, wherein said measure of data packet transfer integrity comprises said measure of signal strength.

* * * * *